United States Patent
Baker et al.

(10) Patent No.: US 10,169,663 B2
(45) Date of Patent: Jan. 1, 2019

(54) SCENE CHANGE DETECTION VIA MULTIPLE SENSORS

(71) Applicant: The Boeing Company, Chicago, IL (US)

(72) Inventors: Anthony W. Baker, Gilbertsville, PA (US); Robert J. Klein, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 83 days.

(21) Appl. No.: 15/254,763

(22) Filed: Sep. 1, 2016

(65) Prior Publication Data

US 2018/0060670 A1 Mar. 1, 2018

(51) Int. Cl.
*G06K 9/00* (2006.01)
*G06K 9/62* (2006.01)

(52) U.S. Cl.
CPC ....... *G06K 9/00771* (2013.01); *G06K 9/6268* (2013.01)

(58) Field of Classification Search
CPC ..... B41J 2/2054; B41J 2/2139; H04N 1/4051; H04N 1/4052; H04N 1/6041
USPC ........ 382/103, 236, 224, 159, 207; 348/699, 348/143, 154, 169, 152, 156, 168, 170, 348/171, 172, 164; 250/330
See application file for complete search history.

(56) References Cited

U.S. PATENT DOCUMENTS

| | | | |
|---|---|---|---|
| 5,809,171 A | 9/1998 | Neff et al. | |
| 5,890,808 A | 4/1999 | Neff et al. | |
| 5,946,422 A | 8/1999 | Neff et al. | |
| 5,982,930 A | 11/1999 | Neff et al. | |
| 5,982,945 A | 11/1999 | Neff et al. | |
| 7,702,183 B1 | 4/2010 | Johnson et al. | |
| 9,000,371 B2* | 4/2015 | Abreo | H04N 5/33 250/330 |
| 9,683,834 B2* | 6/2017 | Hsin | G01B 11/22 |
| 2016/0080668 A1* | 3/2016 | Labudovic | H04N 5/33 348/164 |

* cited by examiner

*Primary Examiner* — Charlotte M Baker
(74) *Attorney, Agent, or Firm* — McDonnell Boehnen Hulbert & Berghoff LLP

(57) ABSTRACT

An example method includes determining first classification rule(s) based on first data that classifies pixel groups of first reference image(s) as types of objects. The first reference image(s) are captured by a first sensor. The method further includes determining second classification rule(s) based on second data that classifies pixel groups of second reference image(s) as types of objects. The second reference image(s) are captured by a second sensor. The method includes classifying, as respective first objects, pixel group(s) of a first image of a scene based on the first classification rule(s). The method includes classifying, as respective second objects, pixel group(s) of a second image of the scene based on the second classification rule(s). The method further includes determining whether a change occurred in the scene based on the object classification of the first image(s) and the second image(s).

20 Claims, 11 Drawing Sheets

SCENE CHANGE DETECTION VIA MULTIPLE SENSORS

FIELD

The present disclosure generally relates to methods and systems for determining whether a change occurred within a scene, and more particularly to methods and systems for using multiple sensors to determine whether a change occurred within the scene.

BACKGROUND

Being able to detect the occurrence and the specific nature of object-level changes that occur within a scene (e.g., a physical location) may be useful for many remote sensing applications. Such applications may include detecting new construction and building alterations, or performing other remote sensing. For example, within a scene it may be useful to detect the appearance of a new object, the disappearance of a pre-existing object, or movement or other changes related to a particular object.

Known approaches for detecting differences between images of a common scene typically utilize pixel-based analysis and/or analysis of spectral images. Pixel-based analysis sometimes fails to identify object-level changes within a scene and generally is not useful in determining the specific nature of such object-level changes. That is, pixel-based analysis might be useful to determine that a new object has appeared within the scene, but might not be useful in determining that a new house has been built at the scene. Pixel-based analysis is also often complicated by differing capture conditions of the images under analysis, such as differences in illumination or cloud cover.

In addition, useful comparison of spectral images typically requires that the spectral images were captured by the same sensor, identical sensors, or very similar sensors. For example, a first image captured by a red-green-blue (RGB) sensor and a second image captured by an infrared sensor would be incompatible for pixel-by-pixel comparison because the intensity and colors depicted in an RGB image might not have the same meaning as the same intensity and colors depicted in an infrared image.

Accordingly, there is a need for systems and methods for improving detection and characterization of object-level changes that occur within in a scene.

SUMMARY

In one example, a method for determining whether a change occurred within a scene is described. The method includes determining one or more first classification rules based on first data that classifies pixel groups of one or more first reference images as types of objects. The one or more first reference images are captured by a first sensor. The method further includes determining one or more second classification rules based on second data that classifies pixel groups of one or more second reference images as types of objects. The one or more second reference images are captured by a second sensor. The method further includes classifying, as respective first objects, one or more pixel groups of a first image of the scene based on the one or more first classification rules. The method further includes classifying, as respective second objects, one or more pixel groups of a second image of the scene based on the one or more second classification rules. The method further includes, based on the classification of the one or more pixel groups of the first image as the respective first objects and the classification of the one or more pixel groups of the second image as the respective second objects, determining whether the change occurred within the scene.

In another example, a non-transitory computer readable medium is described. The non-transitory computer readable medium stores instructions that, when executed by a computing device, cause the computing device to perform functions for determining whether a change occurred within a scene. The functions include determining one or more first classification rules based on first data that classifies pixel groups of one or more first reference images as types of objects. The one or more first reference images are captured by a first sensor. The functions further include determining one or more second classification rules based on second data that classifies pixel groups of one or more second reference images as types of objects. The one or more second reference images are captured by a second sensor. The functions further include classifying, as respective first objects, one or more pixel groups of a first image of the scene based on the one or more first classification rules. The functions further include classifying, as respective second objects, one or more pixel groups of a second image of the scene based on the one or more second classification rules. The functions further include, based on the classification of the one or more pixel groups of the first image as the respective first objects and the classification of the one or more pixel groups of the second image as the respective second objects, determining whether the change occurred within the scene.

In yet another example, a computing device is described. The computing device includes one or more processors and a non-transitory computer readable medium storing instructions that, when executed by the one or more processors, cause the computing device to perform functions for determining whether a change occurred within a scene. The functions include determining one or more first classification rules based on first data that classifies pixel groups of one or more first reference images as types of objects. The one or more first reference images are captured by a first sensor. The functions further include determining one or more second classification rules based on second data that classifies pixel groups of one or more second reference images as types of objects. The one or more second reference images are captured by a second sensor. The functions further include classifying, as respective first objects, one or more pixel groups of a first image of the scene based on the one or more first classification rules. The functions further include classifying, as respective second objects, one or more pixel groups of a second image of the scene based on the one or more second classification rules. The functions further include, based on the classification of the one or more pixel groups of the first image as the respective first objects and the classification of the one or more pixel groups of the second image as the respective second objects, determining whether the change occurred within the scene.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Figure 1:
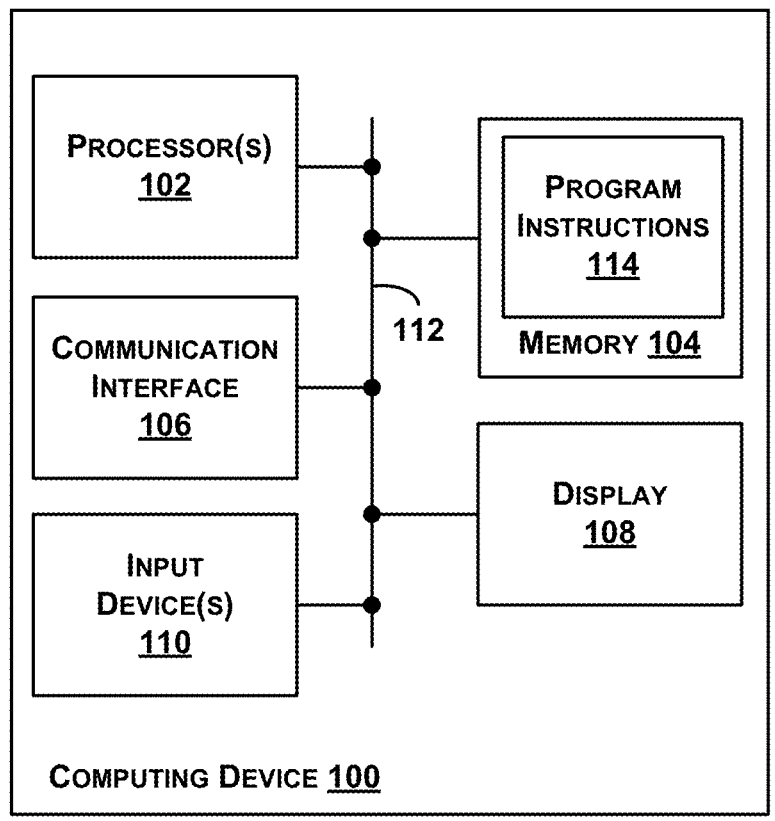
FIG. 1 illustrates an example computing device, according to an example embodiment.

Within examples, images of a scene captured by two different sensors at two different times may be used to determine whether a change has occurred within the scene. For instance, a first sensor (e.g., a red-green-blue (RGB) sensor or an infrared sensor) may be used to capture first reference images over a period of time. The first reference images may be images of many different scenes captured under varying capture conditions such as illumination or cloud cover. In addition, first data that corresponds to the first reference images may be generated. The first data may classify various pixel groups of the first reference images as types of objects and/or as specific objects (e.g., building #502A). In some instances, at least some of the first data may be reviewed or generated by a human being to help ensure that the first data correctly identifies various pixel groups of the first reference images as types of objects and/or as specific objects.

A computing device may then "train" itself by accessing the first reference images and the first data to determine (e.g., infer via deep learning techniques) first classification rules that correctly classify pixel groups of the first reference images as types of objects and/or as specific objects. The process may be simplified if the pixel groups of the first reference images are evaluated to only determine whether the pixel groups correspond to a limited number of object classes (e.g., buildings, persons, or bodies of water). The computing device may train itself in a similar fashion with regard to second reference images captured by a second sensor. That is, the computing device may use the second reference images and second data that classifies pixel groups of the second reference images as types of objects or as specific objects to determine second classification rules. The second classification rules determined by the computing device may correctly classify pixel groups of the second reference images as types of objects and/or as specific objects. It should be noted that this process may involve the computing device developing, via deep learning and/or machine learning, classification rules based on reference images and classification data, and that the process might not involve the use of conventional image classification techniques such as k-means clustering, multispectral pattern recognition, and/or the Iterative Self-Organizing Data Analysis Technique (ISODATA).

Once the computing device has been "trained" as described above, the computing device is ready to analyze a first unclassified image of a particular scene captured by the first sensor and classify pixel groups of the first image as respective first objects using the determined first classification rules. Similarly, the computing device may also analyze a second unclassified image of the scene captured by the second sensor after the capture of the first image and classify pixel groups of the second image as respective second objects using the determined second classification rules. Lastly, the computing device may use the classification of the pixel groups of the first and second images to detect changes (if any) that have occurred within the scene. For example, the computing device may determine that a particular building that was captured in the first image of the scene is no longer present in the second image of the scene. Identifying one or more objects that are present within both the first and second images of the scene can help ensure that the first and second images of the scene are being analyzed with respect to the same frame of reference. These techniques do not require that the first and second images of the scene are captured under similar conditions, nor do they require that the first and second sensors are configured to capture the same wavelengths of electromagnetic waves.

Disclosed embodiments will now be described more fully hereinafter with reference to the accompanying Drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Referring now to FIG. 1, an example computing device 100 is illustrated. In some examples, components illustrated in FIG. 1 may be distributed across multiple computing devices. However, for the sake of example, the components are shown and described as part of one example computing device 100. The computing device 100 may be or include a mobile device (such as a mobile phone), a desktop computer, a laptop computer, a tablet computer, a server, a network of multiple servers, or similar device(s) that may be configured to perform the functions described herein.

As shown in FIG. 1, the computing device 100 may include one or more processors 102, a memory 104, a communication interface 106, a display 108, and one or more input devices 110. Components illustrated in FIG. 1 may be linked together by a system bus, network, or other connection mechanism 112. The computing device 100 may also include hardware to enable communication within the computing device 100 and between the computing device 100 and one or more other devices. The hardware may include transmitters, receivers, and antennas, for example.

The one or more processors 102 may be any type of processor, such as a microprocessor, digital signal processor, multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the memory 104 may be configured to store program instructions 114. The program instructions 114 may be executable by the one or more processors 102 to cause the computing device 100 to perform any of the functions described herein.

The communication interface 106 may be configured to facilitate communication with one or more other devices, in accordance with one or more wired or wireless communication protocols. For example, the communication interface 106 may be configured to facilitate wireless data communication for the computing device 100 according to one or more wireless communication standards, such as one or more IEEE 801.11 standards, ZigBee standards, Bluetooth standards, etc. As another example, the communication interface 106 may be configured to facilitate wired data communication with one or more other devices.

The display 108 may be any type of display component configured to display data. As one example, the display 108 may include a touchscreen display. As another example, the display may include a flat-panel display, such as a liquid-crystal display (LCD) or a light-emitting diode (LED) display.

The one or more input devices 110 may include one or more pieces of hardware used to provide data and control signals to the computing device 100. For instance, the one or more input devices 110 may include a mouse or a pointing device, a keyboard or a keypad, a microphone, a touchpad, or a touchscreen, among other possible types of input devices. Generally, the one or more input devices 110 may allow an operator to interact with a graphical user interface (GUI) provided by the computing device 100.

Figure 2:
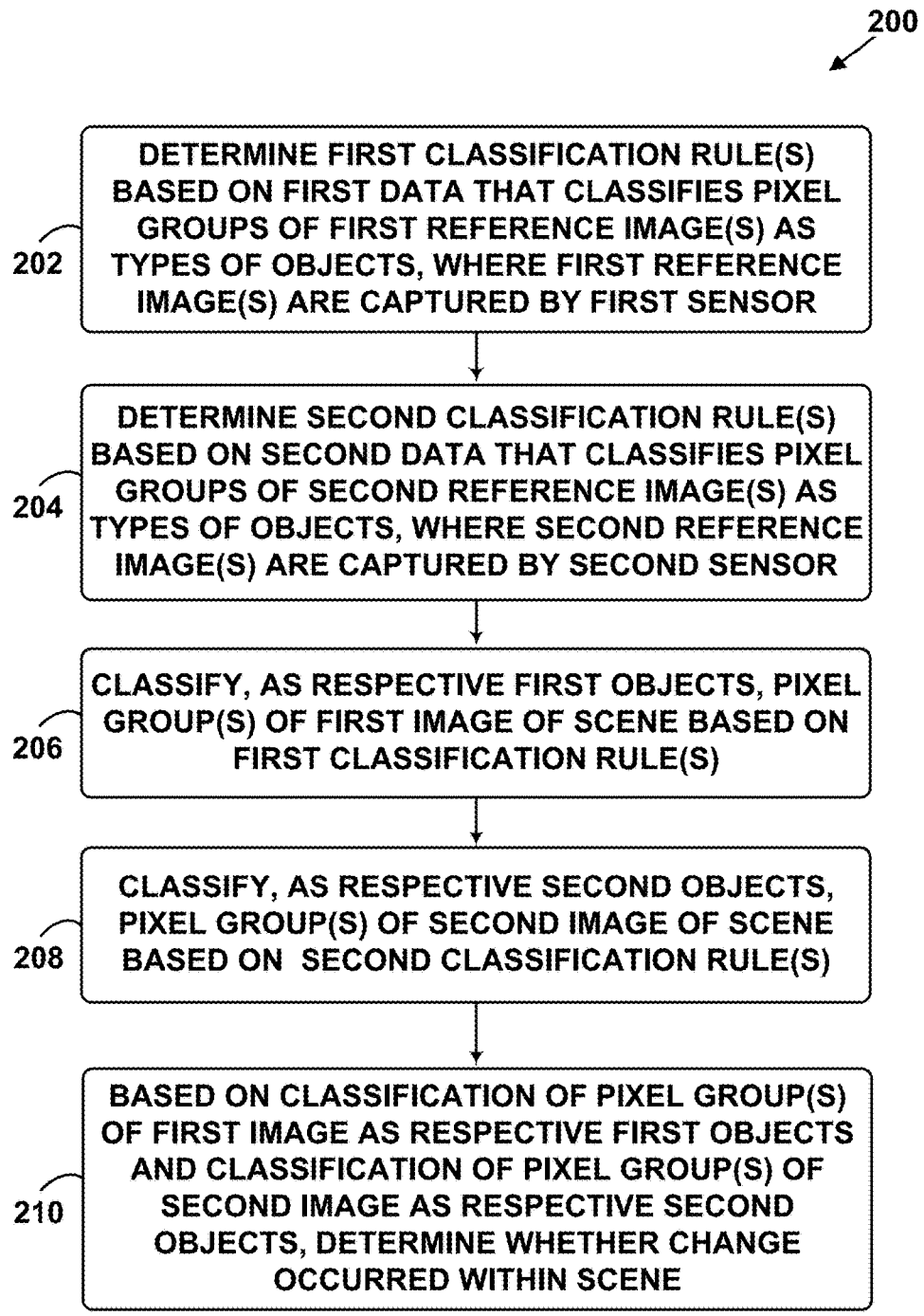
FIG. 2 is a flowchart of an example method for determining whether a change occurred within a scene, according to an example embodiment.
Figure 3:
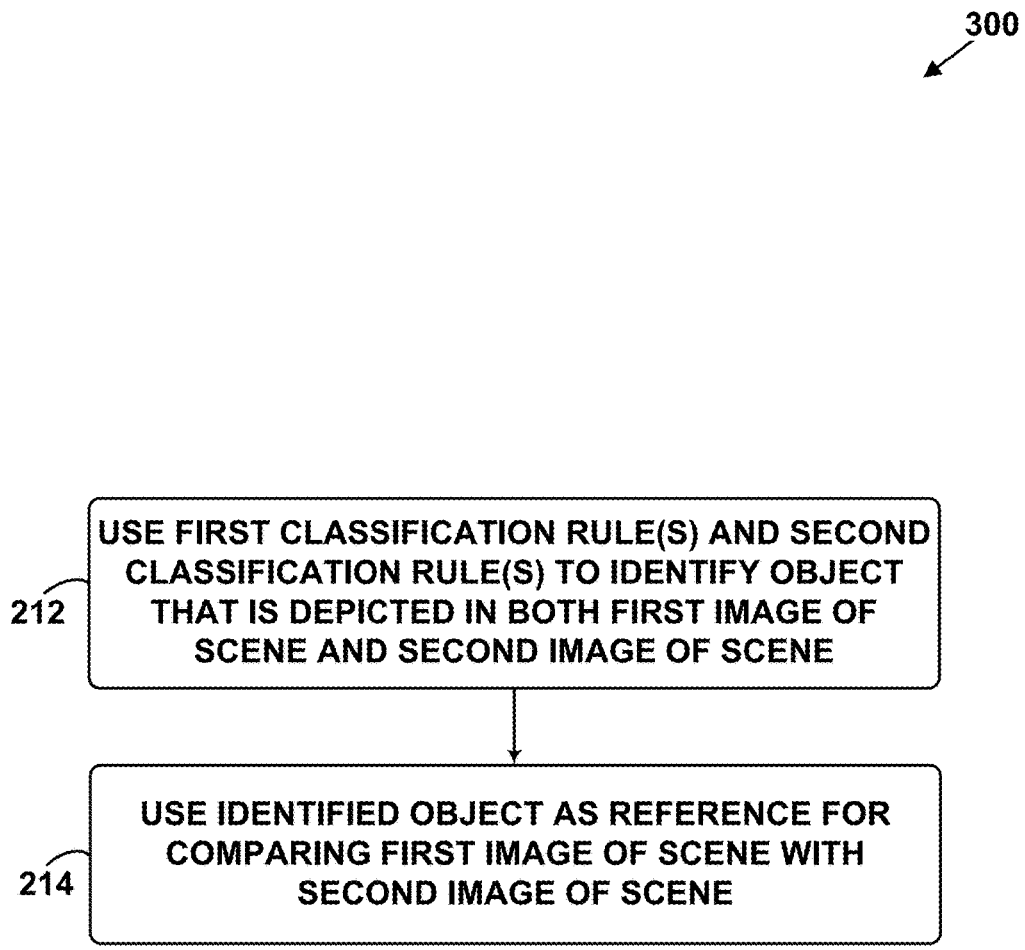
FIG. 3 is a flowchart of another example method for use with the method shown in FIG. 2, according to an example embodiment.

Methods 200 and 300 depicted in FIGS. 2 and 3 present example methods that can be performed by the computing device 100. In other examples, the methods 200 and 300 may be performed by any combination of one or more suitable components described herein. FIGS. 2 and 3 may include one or more operations, functions, or actions as illustrated by one or more of blocks 202, 204, 206, 208, 210, 212, and 214. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the methods 200 and 300, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in a process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache, or Random Access Memory (RAM). The computer readable medium may also include non-transitory media, such as secondary or persistent long term storage, like read-only memory (ROM), optical or magnetic disks, or compact-disc read-only memory (CD-ROM), for example. The computer readable media may also be any other volatile or non-volatile storage system. The computer readable medium may be considered a computer readable storage medium, a tangible storage device, or other article of manufacture, for example.

In addition, for the methods 200 and 300 and other processes and methods disclosed herein, each block in FIGS. 2 and 3 may represent circuitry that is wired to perform the specific logical functions in the process.

Referring to FIG. 2, the method 200 is an example method for determining whether a change occurred within a scene.

At block 202, the method 200 includes determining one or more first classification rules based on first data that classifies pixel groups of one or more first reference images as types of objects. In this context, the one or more first reference images are captured by a first sensor.

Figure 4:
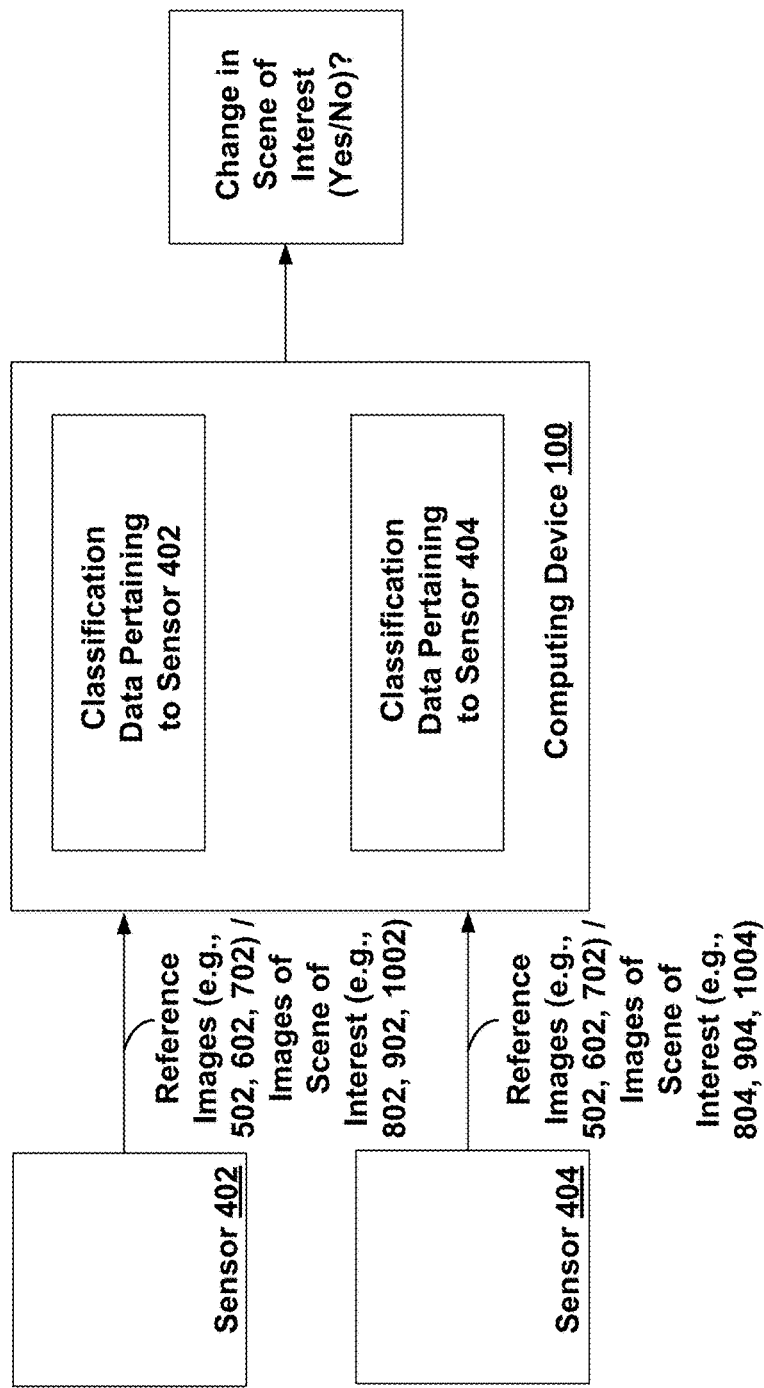
FIG. 4 is a block diagram of example sensors and an example computing device, according to an example embodiment.
Figure 5:
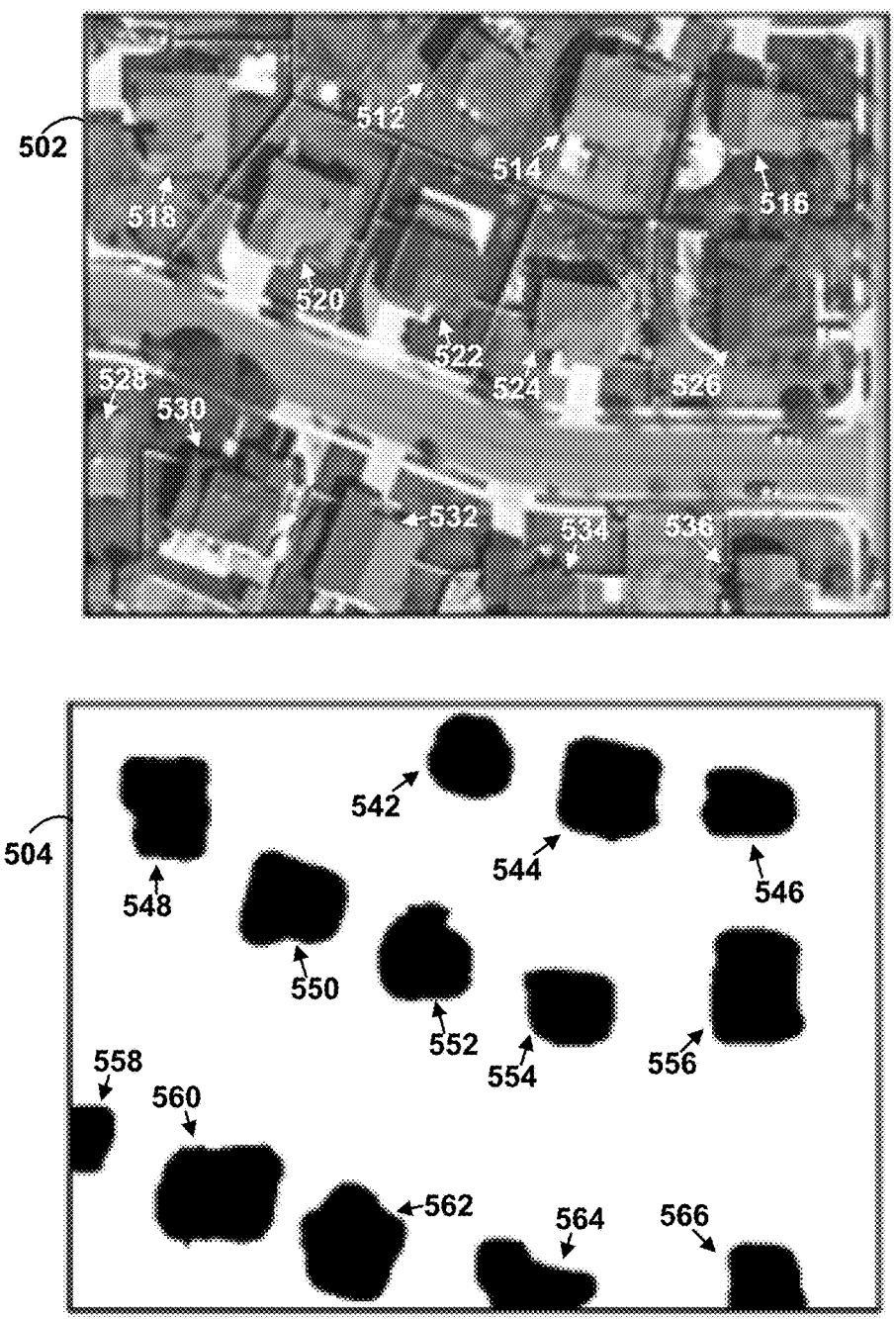
FIG. 5 illustrates a reference image and data that classifies pixel groups of the reference image as types of objects, according to an example embodiment.
Figure 6:
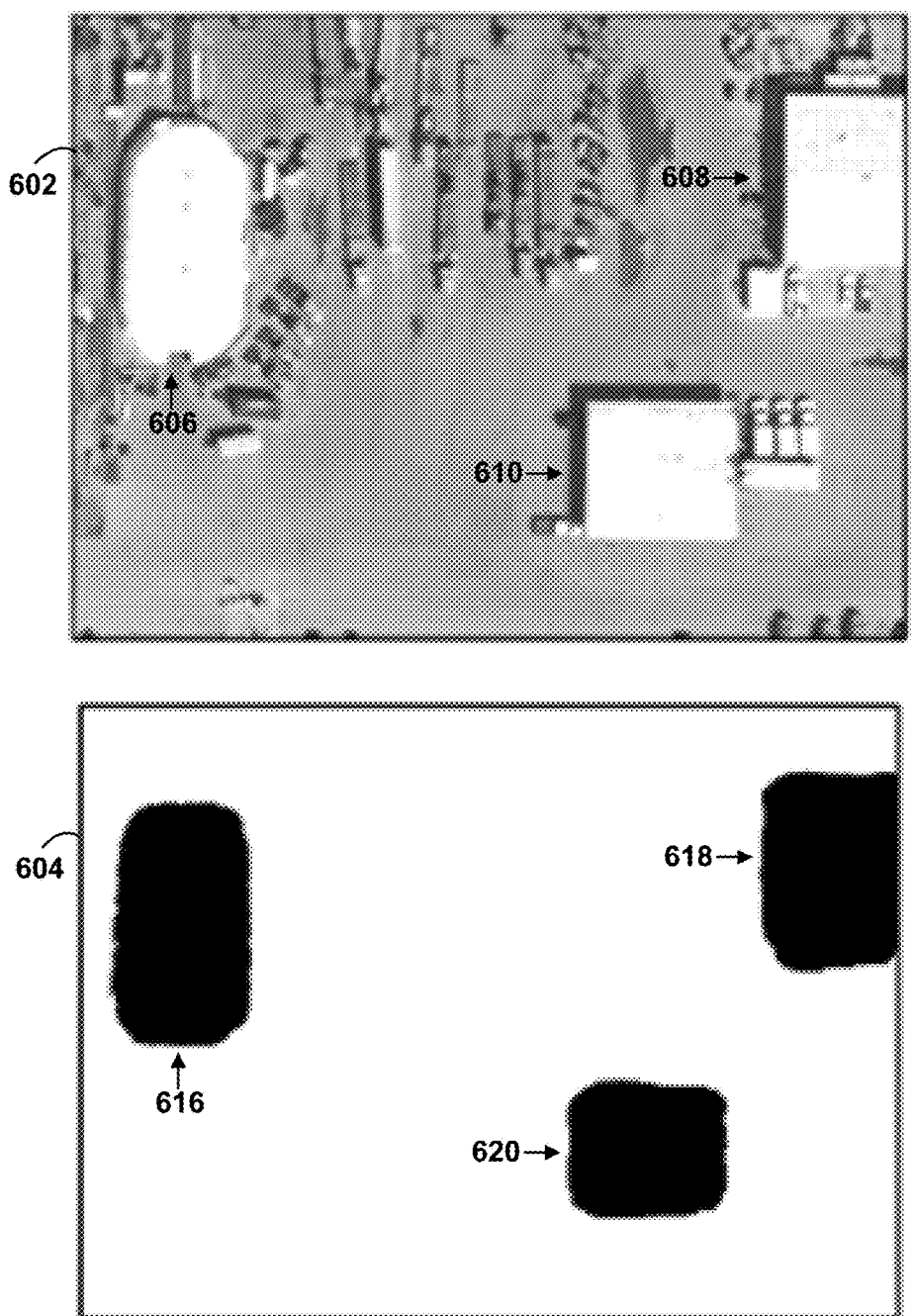
FIG. 6 illustrates a reference image and data that classifies pixel groups of the reference image as types of objects, according to an example embodiment.
Figure 7:
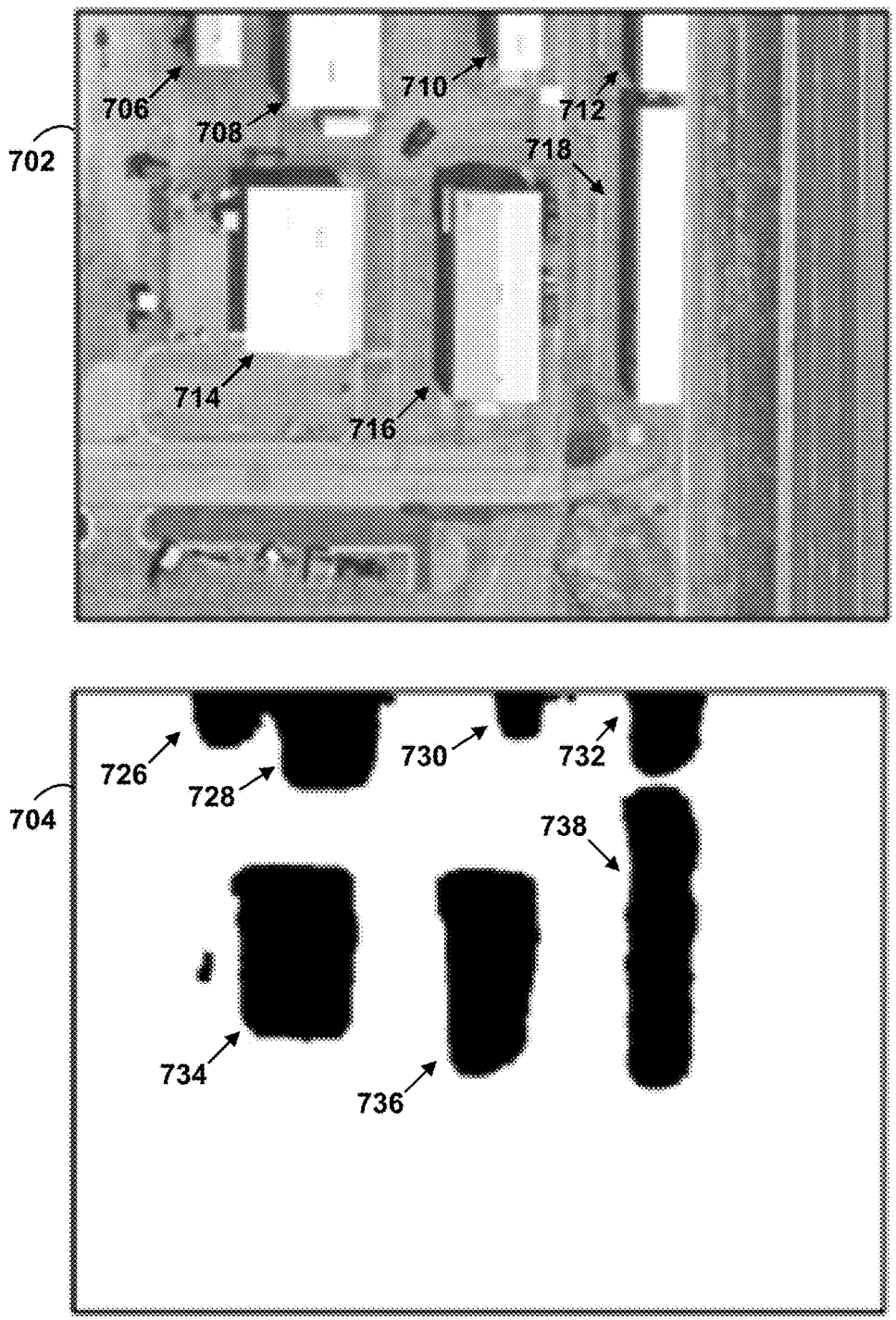
FIG. 7 illustrates a reference image and data that classifies pixel groups of the reference image as types of objects, according to an example embodiment.

For example, sensor 402 of FIG. 4 may capture reference images 502, 602, and 702 shown respectively in FIGS. 5, 6, and 7. The sensor 402 may capture the reference images 502, 602, and 702 over a time period that spans minutes, hours, days, months, or even years. The sensor 402 may be a red-green-blue (RGB)/visible light sensor, an infrared/thermal sensor, a short-wave infrared (SWIR) sensor, an ultraviolet (UV) sensor, a radio frequency (RF)/radar sensor, a multispectral sensor, a hyperspectral sensor, a combination of any of the above, or any other type of sensor configured to detect and resolve the wavelength and the intensity of electromagnetic waves within any portion of the electromagnetic spectrum. The sensor 402 may be mounted on an airplane or a satellite as the sensor 402 captures the reference images 502, 602, and 702, for example. The sensor 402 may be integrated as part of a camera or a thermal imaging device, but other examples are possible.

The reference images 502, 602, and 702 may be captured at various times and may represent different scenes (e.g., physical locations). Generally, the sensor 402 may capture hundreds, thousands, or even millions of reference images of various scenes, but for the sake of simplicity the discussion herein is mostly limited to the reference images 502, 602, and 702.

Depending on the form of the sensor 402, the reference image 502 may be an RGB/visible image, an infrared/thermal image, or a radar/RF image. Other examples are possible. Generally, the reference image 502 may be a non-spectral image, or an image that does not contain multiple layers of pixels that pertain to multiple respective portions of the electromagnetic spectrum. The reference image 502 exhibits pixel groups 512, 514, 516, 518, 520, 522, 524, 526, 528, 530, 532, 534, and 536. The pixel groups 512-536 correspond respectively to houses that are located in a residential neighborhood.

The data 504 is presented in a visual format to indicate that the pixel groups 512-536 correspond respectively to object markers 542, 544, 546, 548, 550, 552, 554, 556, 558, 560, 562, 564, and 566 of the data 504. For example, the data 504 indicates that a pixel group having the same relative location within the reference image 502 as the relative location of the object marker 542 within the data 504 is a building (e.g., a specific building referred to as "Building A"). In the example of FIG. 5, the pixel group indicated by the object marker 542 is the pixel group 512. Similarly, the data 504 indicates the classification of the pixel groups 514-536 as objects (e.g., "Building B," "Building C," etc.) represented by the respective object markers 544-566.

The data 504 may be a subset or "layer" of a larger data set. In this context, the data 504 may be a "buildings" or "houses" layer, the purpose of which is to only identify pixel groups of the reference image 502 that correspond to houses or buildings. Other subsets or layers of the larger data set may have the purpose of identifying pixel groups within the reference image 502 that correspond to (a) sidewalks, driveways, and other concrete, (b) trees, shrubs, or bushes, or (c) bodies of water, for example. In some situations, it may be useful to train the computing device 100 to only recognize buildings and/or houses without spending time or computing resources training the computing device 100 to recognize other types of objects within unclassified images. In some situations, however, it may be useful for the computing device 100 to train itself to recognize and identify other types of objects. In such cases, the data 504 (and the data 604 and 704 discussed below) may also classify additional pixel groups of reference images as types of objects or as specific objects (e.g., (a) sidewalks, driveways, and other concrete, (b) trees, shrubs, or bushes, or (c) bodies of water) other than those that are of primary interest (e.g., buildings and/or houses).

The computing device 100 identifying objects of secondary interest can still be useful in that a body of water, a tree, a road, a driveway, or any other object that is identified as appearing in two images can be used as a point of reference for "registering" the images, or establishing a common point of reference. As such, the computing device 100 may also develop classification rules for identifying objects of types that are different than the object type(s) of primary interest. This is discussed in more detail below with regard to blocks 206 and 208.

Depending on the form of the sensor 402, the reference image 602 may be an RGB image, an infrared image, or a radar image. Other examples are possible. Generally, the reference image 602 may be a non-spectral image. The reference image 602 exhibits pixel groups 606, 608, and 610. The pixel groups 606-610 correspond respectively to buildings that are located at a scene depicted by FIG. 6.

The data 604 indicates that the pixel groups 606-610 correspond respectively to object markers 616, 618, and 620 of the data 604. For example, the data 604 indicates that a pixel group having the same relative location within the reference image 602 as the relative location of the object marker 616 within the data 604 is a building (e.g., "Building D"). In the example of FIG. 6, the pixel group indicated by the object marker 616 is the pixel group 606. Similarly, the data 604 indicates the classification of the pixel groups 608 and 610 as objects (e.g., "Building E," "Building F," etc.) represented by the respective object markers 618 and 620. Similar to the data 504, the data 604 may be a subset of a larger data set, with the data 604 being focused on identifying pixel groups of the reference image 602 that correspond to houses or buildings. In other examples, the data 604 may also identify objects of the reference image 602 other than houses or buildings.

Depending on the form of the sensor 402, the reference image 702 may be an RGB image, an infrared image, or a radar image. Other examples are possible. Generally, the reference image 702 may be a non-spectral image. The reference image 702 exhibits pixel groups 706, 708, 710, 712, 714, 716, and 718. The pixel groups 706-718 correspond respectively to buildings that are located at a scene depicted by FIG. 7.

The data 704 indicates that the pixel groups 706-718 correspond respectively to object markers 726, 728, 730, 732, 734, 736, and 738 of the data 704. For example, the data 704 indicates that a pixel group having the same relative location within the reference image 702 as the relative location of the object marker 734 within the data 704 is a building (e.g., "Building G"). In the example of FIG. 7, the pixel group indicated by the object marker 734 is the pixel group 714. Similarly, the data 704 indicates the classification of the pixel groups 706, 708, 710, 712, 716, and 718 as objects (e.g., "Building H," "Building I," etc.) represented by the respective object markers 726, 728, 730, 732, 736, and 738. Similar to the data 504 and the data 604, the data 704 may be a subset of a larger data set, with the data 704 being focused on identifying pixel groups of the reference image 702 that correspond to houses or buildings. In other examples, the data 704 may also identify objects of the reference image 702 other than houses or buildings.

The computing device 100 may access the reference images 502, 602, and 702 locally via the memory 104, from the sensor 402 via the communication interface 106, or from another computing device via the communication interface 106. The computing device 100 may also access the data 504, 604, and 704 locally via the memory 104 or from another computing device via the communication interface 106. The computing device 100 may use the reference images 502, 602, and 702 and the data 504, 604, and 704 to develop classification rules and/or identify patterns for classifying objects captured in previously unclassified images. In a sense, the data 604 represents a premise that the pixel groups 606, 608, and 610 correspond to object types, specific objects, or specific buildings represented by the object markers 616, 618, and 620. Using this information, the aforementioned information embodied by the reference images 502 and 702 and the data 504 and 704, and perhaps many more sets of images and classification data, the computing device 100 may analyze pixel groups that are known to correspond to types of objects, specific objects, or specific buildings. The more such data that is accessible to the computing device 100, the more so the computing device 100 may develop and fine-tune classification rules or identify patterns that may be used to identify objects captured in unclassified images. It should be noted that this process may involve the computing device developing, via deep learning and/or machine learning, classification rules based on reference images and classification data, and that the process might not involve the use of conventional image classification techniques such as k-means clustering, multispectral pattern recognition, and/or the Iterative Self-Organizing Data Analysis Technique (ISODATA).

For instance, the computing device 100 may determine that the object markers 542-566 are indicative of houses that correspond respectively to the pixel groups 512-536 based on the relative locations of the object markers 542-566 within the data 504 and the relative locations of the pixel groups 512-536 within the reference image 502. The computing device 100 may also evaluate the shape, size, color, and/or other characteristics of the pixel groups 512-536 and develop "rules" that pixel groups having certain shapes, sizes, and/or colors generally correspond to houses.

For example, the computing device 100 may determine that houses generally have one or more pitched sections of roof, one or more square corners when viewed from above, a simple geometric shape or a shape represented by a few simple overlapping geometric shapes, proximity to concrete driveways, a size greater than about 500 square feet when viewed from above, and regular spacing with respect to other houses. In analyzing such data, the computing device 100 may also discover counterexamples to the classification rules that may be used to refine, correct, or clarify the classification rules. For example, the computing device 100 may discover one or more pixel groups that, according to the previously developed rules, "looks" like a house but is not identified as such by accompanying classification data. Additionally or alternatively, the computing device 100 may discover a pixel group that, according to the previously developed rules, does not "look" like a house but is identified as a house by the accompanying classification data. In this way, the determined classification rules can be refined and verified to help ensure that the classification rules, when applied to unclassified images, identify specific objects as accurately as possible.

It should be noted that the aforementioned examples of patterns or classification rules are discussed herein solely for purposes of illustration and that the computing device 100 may use many reference images and many sets of classification data to develop classification rules or recognize patterns that are much more complex than discussed herein, as is known in the art.

At block 204, the method 200 includes determining one or more second classification rules based on second data that classifies pixel groups of one or more second reference images as types of objects. In this context, the one or more second reference images are captured by a second sensor.

For example, the sensor 404 depicted in FIG. 4 may take any form as the sensor 402 may take and may perform any function as the sensor 402 might perform. The sensor 404 may be used to capture any number of second reference images similar to the reference images 502, 602, and 702. Similar to what is described above, the computing device 100 may use the second reference images captured by the sensor 404, along with second classification data that is similar to the data 504, 604, and 704, to "train" the computing device 100 and develop second classification rules and/or identify patterns for identifying objects within unclassified images captured by the sensor 404. The second classification rules the computing device 100 develops for the sensor 404 may be different from the rules the computing device 100 develops for the sensor 402, especially if the sensor 404 is configured to detect wavelengths of electromagnetic waves that are different than those the sensor 402 is configured to detect.

At block 206, the method 200 includes classifying, as respective first objects, one or more pixel groups of a first image of the scene based on the one or more first classification rules.

Similarly, at block 208, the method 200 includes classifying, as respective second objects, one or more pixel groups of a second image of the scene based on the one or more second classification rules.

Also, at block 210 the method 200 includes, based on the classification of the one or more pixel groups of the first image as the respective first objects and the classification of the one or more pixel groups of the second image as the respective second objects, determining whether the change occurred within the scene.

Blocks 206, 208, and 210 will be discussed in more detail below with reference to FIG. 8, FIG. 9, and FIG. 10.

Additionally, as shown in FIG. 3, block 212 of the method 300 includes using the one or more first classification rules and the one or more second classification rules to identify an object that is depicted in both the first image of the scene and the second image of the scene.

Furthermore, at block 214, the method 300 includes using the identified object as a reference for comparing the first image of the scene with the second image of the scene.

Figure 8:
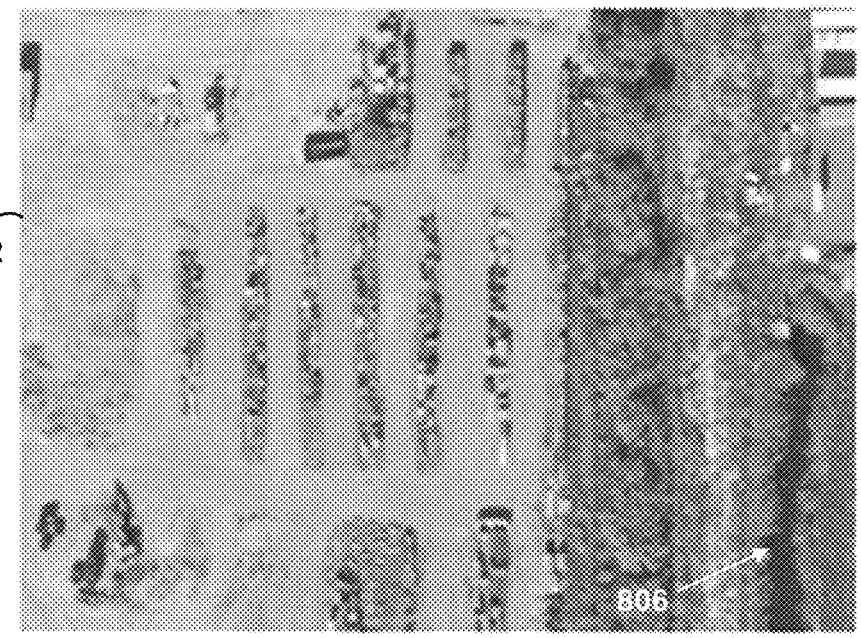
FIG. 8 illustrates images of a scene, according to an example embodiment.
Figure 8:
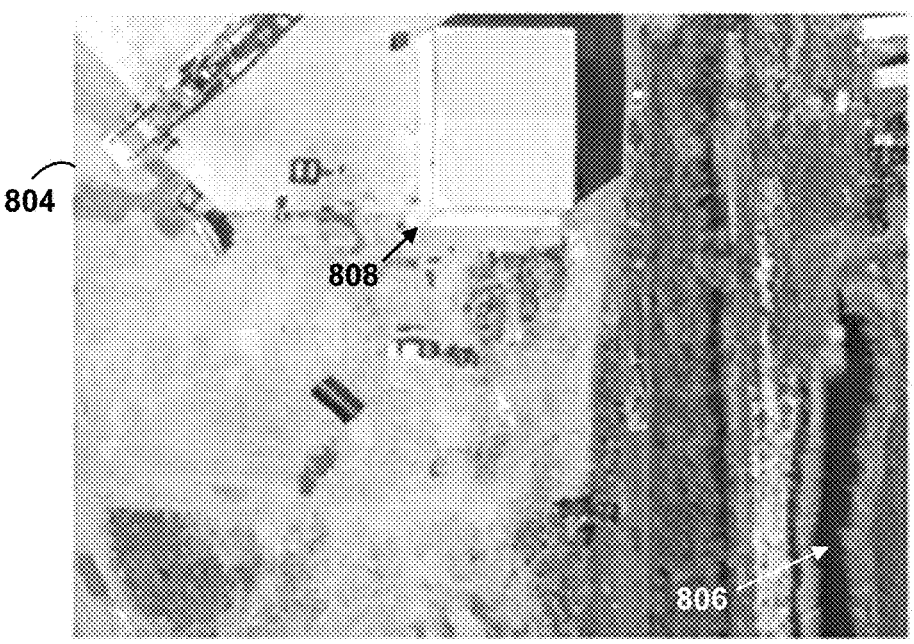

Referring to FIG. 8, for example, the image 802 and the image 804 might be images of the same scene, captured at different times. The image 802 may have been captured by the sensor 402 and the image 804 may have been captured by the sensor 404 subsequent to the capture of the image 802. For example, the time period separating the capture of the image 802 and the image 804 may be minutes, hours, days, months, or even years. Other examples are possible.

The computing device 100 may use the classification rules determined for the sensor 402 at block 202 to determine that there are no buildings present within the image 802. Additionally, the computing device 100 may analyze the image 802 and use the classification rules determined for the sensor 402 at block 202 to classify the object 806 as "body of water A." The object 806 may be used as a reference object, that is, a reference point for comparison with the image 804.

For example, the computing device 100 may use the classification rules determined for the sensor 402 at block 202 to analyze the color/wavelength, shape, size, and/or other characteristics of the object 806 in the image 802. The computing device 100 may also use the classification rules determined for the sensor 404 at block 204 to analyze the color/wavelength, shape, size, and/or other characteristics of the object 806 in the image 804. Furthermore, the computing device 100 may determine that the object 806 captured in the image 804 is the same object 806 that is captured in the image 802. As a result, the computing device 100 may determine that the image 802 and the image 804 both depict the same scene. As such, the computing device 100 may use the object 806 as a reference point for comparing the image 802 to the image 804 to determine whether a change occurred within the scene depicted by the images 802 and 804.

The computing device 100 may further analyze the image 804 using the classification rules determined for the sensor 404 at block 204 to identify the presence of the object 808 and specifically identify the object 808 as a particular building (e.g., "Building X"). That is, the computing device 100 may use the classification rules the computing device 100 developed by analyzing reference images captured by the sensor 404 to identify the presence and the specific nature of the object 808.

The computing device 100 may then compare the image 802 to the image 804 and determine that a change has occurred within the scene depicted by images 802 and 804. In this context, the change is the appearance of the object 808.

Figure 9:
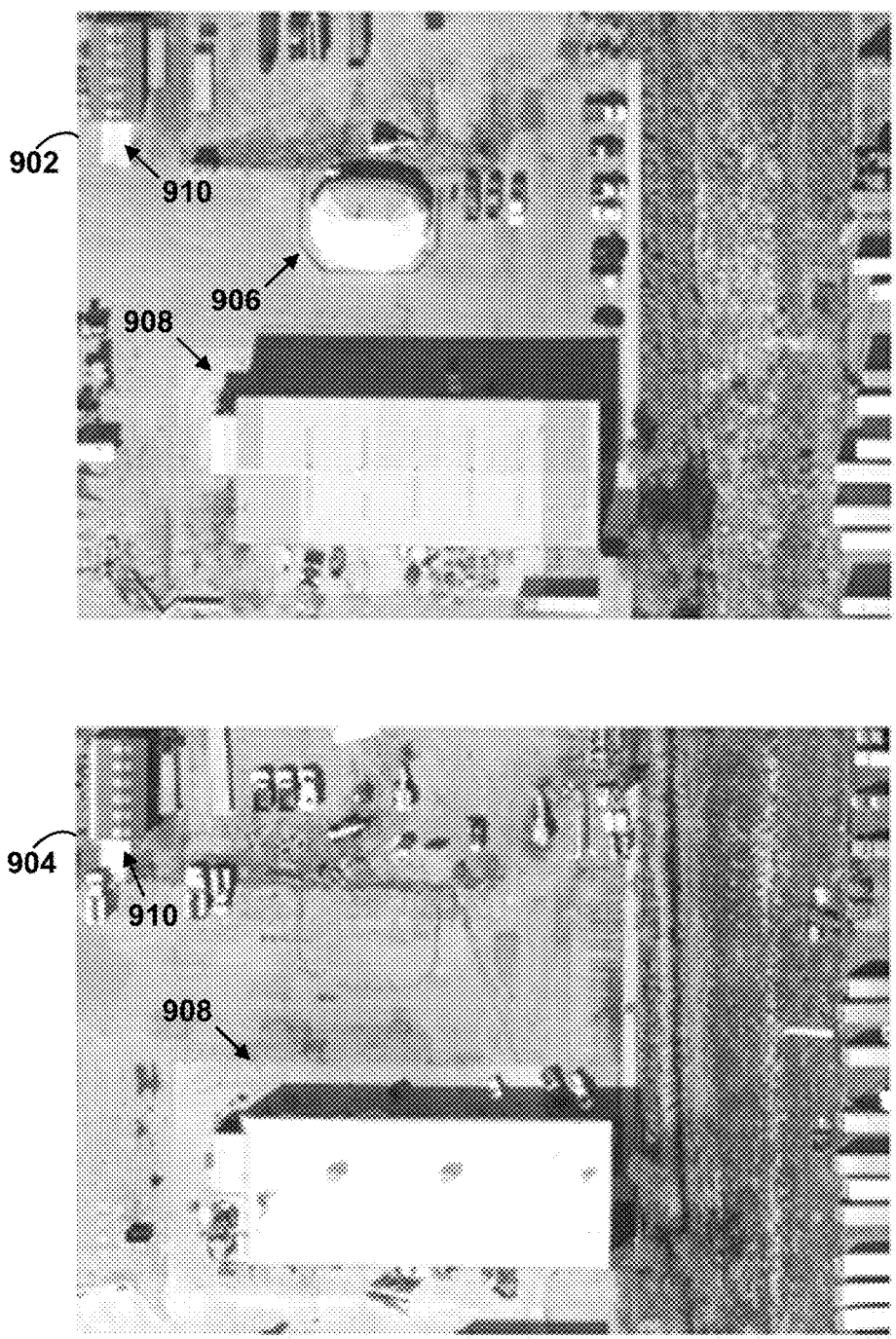
FIG. 9 illustrates images of a scene, according to an example embodiment.

In another example depicted in FIG. 9, the image 902 and the image 904 might be images of the same scene, captured at different times. The image 902 may have been captured by the sensor 402 and the image 904 may have been captured by the sensor 404 subsequent to the capture of the image 902. For example, the time period separating the capture of the image 902 and the image 904 may be minutes, hours, days, months, or even years. Other examples are possible.

The computing device 100 may analyze the image 902 and use the classification rules determined for the sensor 402 at block 202 to classify the objects 906, 908, and 910 as particular buildings. The object 910 may be used as a reference object, that is, a reference point for comparison with the image 904.

For example, the computing device 100 may use the classification rules determined for the sensor 402 at block 202 to analyze the color/wavelength, shape, size, and/or other characteristics of the object 910 in the image 902. The computing device 100 may also use the classification rules determined for the sensor 404 at block 204 to analyze the color/wavelength, shape, size, and/or other characteristics of the object 910 in the image 904. Furthermore, the computing device 100 may determine that the object 910 captured in the image 904 is the same object 910 that is captured in the image 902. As a result, the computing device 100 may determine that the image 902 and the image 904 both depict the same scene. As such, the computing device 100 may use the object 910 as a reference point for comparing the image 902 to the image 904 to determine whether a change occurred within the scene depicted by the images 902 and 904.

The computing device 100 may further analyze the image 904 using the classification rules determined for the sensor 404 at block 204 to identify the absence of the object 906 within the image 904. The computing device 100 may then compare the image 902 to the image 904 and determine that a change has occurred within the scene depicted by images 902 and 904. In this context, the change is the disappearance of the object 906.

Figure 10:
FIG. 10 illustrates images of a scene, according to an example embodiment.
Figure 10:

In another example depicted in FIG. 10, the image 1002 and the image 1004 might be images of the same scene, captured at different times. The image 1002 may have been captured by the sensor 402 and the image 1004 may have been captured by the sensor 404 subsequent to the capture of the image 1002. For example, the time period separating the capture of the image 1002 and the image 1004 may be minutes, hours, days, months, or even years. Other examples are possible.

The computing device 100 may analyze the image 1002 and use the classification rules determined for the sensor 402 at block 202 to classify the object 1006 as a particular building, and objects 1008 and 1010 as particular sections of concrete. The objects 1008 and 1010 may be used as a composite reference object, that is, a reference point for comparison with the image 1004.

For example, the computing device 100 may use the classification rules determined for the sensor 402 at block 202 to analyze the color/wavelength, shape, size, and/or other characteristics of the objects 1006, 1008, and 1010 in the image 1002. The computing device 100 may also use the classification rules determined for the sensor 404 at block 204 to analyze the color/wavelength, shape, size, and/or other characteristics of the objects 1008 and 1010 in the image 1004. Furthermore, the computing device 100 may determine that the objects 1008 and 1010 captured in the image 1004 are the same respective objects 1008 and 1010 that are captured in the image 1002. As a result, the computing device 100 may determine that the image 1002 and the image 1004 both depict the same scene. As such, the computing device 100 may use the objects 1008 and 1010 as a composite reference point for comparing the image 1002 to the image 1004 to determine whether a change occurred within the scene depicted by the images 1002 and 1004.

The computing device 100 may further analyze the image 1004 using the classification rules determined for the sensor 404 at block 204 to identify the absence of the object 1006 within the image 1004. The computing device 100 may then compare the image 1002 to the image 1004 and determine that a change has occurred within the scene depicted by images 1002 and 1004. In this context, the change is the disappearance of the object 1006.

Figure 11:
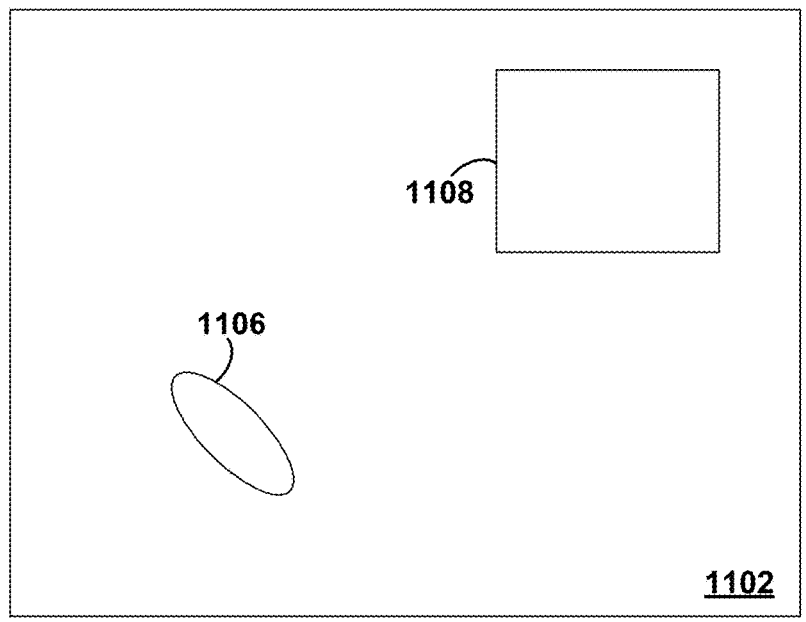
FIG. 11 illustrates images of a scene, according to an example embodiment.
Figure 11:
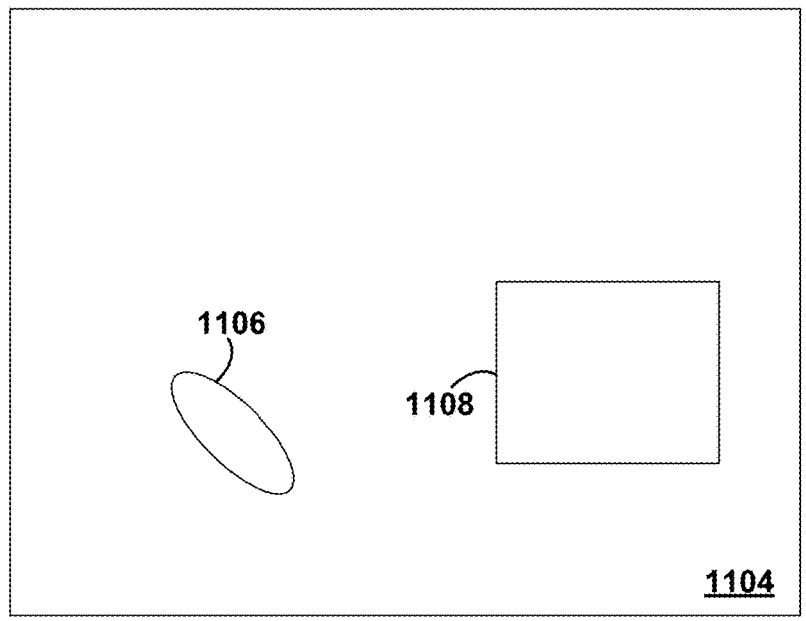

In another example depicted in FIG. 11, the image 1102 and the image 1104 might be images of the same scene, captured at different times. The image 1102 may have been captured by the sensor 402 and the image 1104 may have been captured by the sensor 404 subsequent to the capture of the image 1102. For example, the time period separating the capture of the image 1102 and the image 1104 may be minutes, hours, days, months, or even years. Other examples are possible.

The computing device 100 may analyze the image 1102 and use the classification rules determined for the sensor 402 at block 202 to classify the object 1106 as a particular body of water, and the object 1108 as a particular building. The object 1106 may be used as a reference object, that is, a reference point for comparison with the image 1104.

For example, the computing device 100 may use the classification rules determined for the sensor 402 at block 202 to analyze the color/wavelength, shape, size, and/or other characteristics of the object 1106 in the image 1102. The computing device 100 may also use the classification rules determined for the sensor 404 at block 204 to analyze the color/wavelength, shape, size, and/or other characteristics of the object 1106 in the image 1104. Furthermore, the computing device 100 may determine that the object 1106 captured in the image 1102 is the same object 1106 that is captured in the image 1104. As a result, the computing device 100 may determine that the image 1102 and the image 1104 both depict the same scene. As such, the computing device 100 may use the object 1106 as a reference point for comparing the image 1102 to the image 1104 to determine whether a change occurred within the scene depicted by the images 1102 and 1104.

The computing device 100 may further analyze the image 1104 using the classification rules determined for the sensor 404 at block 204 to determine that the object 1108 has moved within the scene depicted by the images 1102 and 1104. The computing device 100 may then determine that a change has occurred within the scene depicted by images 1102 and 1104. In this context, the change is the movement of the object 1108.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method for determining whether a change occurred within a scene, the method comprising:
    determining, by a computing device, one or more first classification rules based on accessing one or more first references images and first data that classifies pixel groups of the one or more first reference images as types of objects, wherein the one or more first reference images are captured by a first sensor;
    determining, by the computing device, one or more second classification rules based on accessing one or more second reference images and second data that classifies pixel groups of the one or more second reference images as types of objects, wherein the one or more second reference images are captured by a second sensor;

classifying, by the computing device, one or more pixel groups of a first image of the scene as respective first objects based on the one or more first classification rules;

classifying, by the computing device, one or more pixel groups of a second image of the scene as respective second objects based on the one or more second classification rules; and based on the classification of the one or more pixel groups of the first image as the respective first objects and the classification of the one or more pixel groups of the second image as the respective second objects, determining, by the computing device, whether the change occurred within the scene.

2. The method of claim 1, wherein the one or more first classification rules classify the pixel groups of the one or more first reference images as types of objects in accordance with the first data.

3. The method of claim 1, wherein the one or more second classification rules classify the pixel groups of the one or more second reference images as types of objects in accordance with the second data.

4. The method of claim 1, wherein the first image of the scene is captured by the first sensor.

5. The method of claim 1, wherein the second image of the scene is captured by the second sensor.

6. The method of claim 1, wherein the first sensor comprises a first red-green-blue (RGB) sensor and the second sensor comprises a second RGB sensor.

7. The method of claim 1, wherein the first sensor comprises a first infrared sensor and the second sensor comprises a second infrared sensor.

8. The method of claim 1, wherein the first sensor comprises an infrared sensor and the second sensor comprises a red-green-blue (RGB) sensor.

9. The method of claim 1, wherein the first sensor comprises a red-green-blue (RGB) sensor and the second sensor comprises an infrared sensor.

10. The method of claim 1, wherein the first data further classifies the pixel groups of the one or more first reference images as particular respective objects.

11. The method of claim 1, wherein the second data further classifies the pixel groups of the one or more second reference images as particular respective objects.

12. The method of claim 1, further comprising:
using the one or more first classification rules and the one or more second classification rules to identify an object that is depicted in both the first image of the scene and the second image of the scene,
wherein determining whether the change occurred within the scene comprises using the identified object as a reference for comparing the first image of the scene with the second image of the scene.

13. The method of claim 1,
wherein the first image of the scene is captured before the second image of the scene, and
wherein determining whether the change occurred within the scene comprises determining that an object that is depicted in the first image of the scene is not depicted in the second image of the scene.

14. The method of claim 1,
wherein the first image of the scene is captured before the second image of the scene, and
wherein determining whether the change occurred within the scene comprises determining that an object that is depicted in the second image of the scene is not depicted in the first image of the scene.

15. The method of claim 1, wherein determining whether the change occurred within the scene comprises determining that an object that is depicted in the first image of the scene at a first location is depicted in the second image of the scene at a second location that is distinct from the first location.

16. The method of claim 1, wherein at least one of (i) the one or more first reference images, (ii) the one or more second references images, (iii) the first image of the scene, or (iv) the second image of the scene are non-spectral images.

17. A non-transitory computer readable medium storing instructions that, when executed by a computing device, cause the computing device to perform functions for determining whether a change occurred within a scene, the functions comprising:
determining one or more first classification rules based on accessing one or more first references images and first data that classifies pixel groups of the one or more first reference images as types of objects, wherein the one or more first reference images are captured by a first sensor;
determining one or more second classification rules based on accessing one or more second reference images and second data that classifies pixel groups of the one or more second reference images as types of objects, wherein the one or more second reference images are captured by a second sensor;
classifying, as respective first objects, one or more pixel groups of a first image of the scene based on the one or more first classification rules;
classifying, as respective second objects, one or more pixel groups of a second image of the scene based on the one or more second classification rules; and
based on the classification of the one or more pixel groups of the first image as the respective first objects and the classification of the one or more pixel groups of the second image as the respective second objects, determining whether the change occurred within the scene.

18. The non-transitory computer readable medium of claim 17,
wherein the first image of the scene is captured before the second image of the scene, and
wherein determining whether the change occurred within the scene comprises determining that an object that is depicted in the first image of the scene is not depicted in the second image of the scene.

19. A computing device comprising:
one or more processors; and
a non-transitory computer readable medium storing instructions that, when executed by the one or more processors, cause the computing device to perform functions for determining whether a change occurred within a scene, the functions comprising:
determining one or more first classification rules based on accessing one or more first references images and first data that classifies pixel groups of the one or more first reference images as types of objects, wherein the one or more first reference images are captured by a first sensor;

determining one or more second classification rules based on accessing one or more second reference images and second data that classifies pixel groups of the one or more second reference images as types of objects, wherein the one or more second reference images are captured by a second sensor;

classifying, as respective first objects, one or more pixel groups of a first image of the scene based on the one or more first classification rules;

classifying, as respective second objects, one or more pixel groups of a second image of the scene based on the one or more second classification rules; and based on the classification of the one or more pixel groups of the first image as the respective first objects and the classification of the one or more pixel groups of the second image as the respective second objects, determining whether the change occurred within the scene.

20. The computing device of claim 19, wherein the first image of the scene is captured before the second image of the scene, and wherein determining whether the change occurred within the scene comprises determining that an object that is depicted in the second image of the scene is not depicted in the first image of the scene.

* * * * *